(12) United States Patent
Kalwitz et al.

(10) Patent No.: US 7,606,944 B2
(45) Date of Patent: Oct. 20, 2009

(54) DYNAMIC INPUT/OUTPUT OPTIMIZATION WITHIN A STORAGE CONTROLLER

(75) Inventors: George Alexander Kalwitz, Mead, CO (US); Paul Andrew Ashmore, Longmont, CO (US)

(73) Assignee: Dot Hill Systems Corporation, Longmont, CO (US)

(*) Notice: Subject to any disclaimer, the term of this patent is extended or adjusted under 35 U.S.C. 154(b) by 231 days.

(21) Appl. No.: 11/746,994

(22) Filed: May 10, 2007

(65) Prior Publication Data
US 2008/0282030 A1 Nov. 13, 2008

(51) Int. Cl.
G06F 13/00 (2006.01)
G06F 7/00 (2006.01)
(52) U.S. Cl. .................. 710/5; 710/15; 710/52; 711/100; 711/114; 711/158
(58) Field of Classification Search ............. 711/154; 710/5, 52–56
See application file for complete search history.

(56) References Cited

U.S. PATENT DOCUMENTS

| | | | |
|---|---|---|---|
| 4,870,401 A * | 9/1989 | Lee et al. ............... | 340/5.25 |
| 5,426,736 A | 6/1995 | Guineau, III | |
| 5,522,054 A | 5/1996 | Gunlock et al. | |
| 5,613,155 A | 3/1997 | Baldiga et al. | |
| 5,625,794 A * | 4/1997 | Inoue et al. ............. | 711/138 |
| 6,167,496 A | 12/2000 | Fechner | |
| 6,170,042 B1 * | 1/2001 | Gaertner et al. ......... | 711/158 |
| 6,427,184 B1 | 7/2002 | Kaneko et al. | |
| 6,687,765 B2 * | 2/2004 | Surugucchi et al. ...... | 710/15 |
| 6,879,939 B1 | 4/2005 | Lang et al. | |
| 6,922,414 B1 | 7/2005 | Gunlock | |
| 7,089,347 B2 | 8/2006 | Mogi et al. | |
| 2003/0088734 A1 * | 5/2003 | Cavallo et al. .......... | 711/114 |
| 2005/0108450 A1 * | 5/2005 | Sahara et al. ........... | 710/52 |
| 2006/0064572 A1 * | 3/2006 | Packer .................... | 713/1 |
| 2007/0055798 A1 | 3/2007 | Ain et al. | |

OTHER PUBLICATIONS

Smith, Alan Jay "Line (Block) Size Choice for CPU Cache Memories", Jun. 1985, UC Berkeley.*

* cited by examiner

*Primary Examiner*—Christian P Chace
*Assistant Examiner*—Nicholas Simonetti
(74) *Attorney, Agent, or Firm*—Thomas J. Lavan

(57) ABSTRACT

A system and method for optimizing accesses to storage devices based on RAID I/O request characteristics is disclosed. A current I/O request processed by a storage controller is analyzed for relative locality to a previous I/O request, and adjusted over time such that storage device accesses will be efficiently conducted with respect to sequential or random workloads. A storage device access profile is maintained for each storage device based on sequential or random locality characteristics of previous RAID I/O requests. The chunk locations of the two most recent accesses are sampled according to predetermined criteria in order to create a storage device access profile, which governs queue depth and I/O size parameters used to communicate with storage devices. By managing I/O requests to storage devices using this invention, performance of such a storage controller will be optimized for changing random and sequential workloads.

34 Claims, 10 Drawing Sheets

DYNAMIC INPUT/OUTPUT OPTIMIZATION WITHIN A STORAGE CONTROLLER

FIELD OF THE INVENTION

Methods and systems directed to automatically and dynamically determining sequential or random data access patterns for a storage controller are disclosed. In particular, methods and systems that optimize efficiency in accessing RAID storage devices according to sampled data access patterns are disclosed.

BACKGROUND OF THE INVENTION

Redundant Array of Inexpensive Disk (RAID) storage systems are the predominant form of data storage in computer systems today that require high performance and/or high availability data storage for use in applications such as transaction processing, banking, medical applications, e-commerce, database applications, internet applications, mail servers, scientific computing, etc. A RAID system typically includes a number of physically independent disk drives coupled to a RAID controller. The RAID controller is a device that interfaces to a group of physical disk drives and presents them as a single logical disk drive (or multiple logical disk drives) to a computer operating system. RAID controllers employ the techniques of data striping and data redundancy to increase performance and data availability.

Data storage subsystems are commonly used to store data that can either be accessed randomly or in a sequential fashion, based on characteristics of the requesting application program that runs on a host computer. For example, transaction processing or OLTP programs tend to access data in a random fashion whereas a video server would tend to access data in a sequential fashion. Although hard disk drive storage devices can be used to store either random or sequential data, access efficiency is usually different for random or sequential workloads.

Hard disk drives are well known in the storage art, and have various latencies specific to their technology. There is rotational latency, which is the time it takes for the accessed disk platter to rotate such that the data to be accessed is beneath the magnetic head. There is also seek latency, which is the time it takes for the disk drive magnetic head to slew radially to a position where the data to be accessed is beneath the magnetic head. In addition, there are latencies associated with disk drive electronics and firmware to process incoming commands, manage the onboard disk drive cache memory, and send appropriate positioning commands to electromechanical mechanisms. The combination of the various latencies determines the data access time from incoming command to data processing completion (whether read or write).

Furthermore, hard disk drive devices have onboard buffers of varying size that cache read and write data. Storage controllers manage these buffers via queue depth and I/O size parameters. Maximum concurrent I/Os are the number of read or write commands that a disk drive can process simultaneously using onboard memory. It is technology and manufacturer dependent, and is a function of disk cache buffer size and disk drive design. It ranges from a minimum of one to a present-day maximum of 16 to 32 or higher. I/O size is usually highly variable, and can range from a single block being 512 bytes in size to a Megabyte or more. Storage controllers manage the number of concurrent I/Os to each storage device. Based on empirical testing, the number of allowed concurrent I/Os to an individual storage device is generally lower than the maximum concurrent I/Os supported. This number of allowed concurrent I/Os is called queue depth. Sequential workloads are generally optimized by utilizing a low queue depth and large I/O size, while random workloads are generally optimized by utilizing a higher queue depth and a small I/O size.

Some storage controllers are designed to operate in an entirely sequential or entirely random environment. They are set up to provide efficient access in a given mode all the time, without any concern about a changing workload that may alternate between random or sequential access. Such controllers may work well for their intended purpose, and are outside the scope of this invention. Many if not most storage controllers, on the other hand, are designed and intended to be used for general storage requirements—where the workload is unknown and may be a combination of sequential and random access. There are several approaches to dealing with an unknown workload.

A first approach is to optimize the controller for a sequential workload, where sequential accesses are handled efficiently and with minimal latency and random accesses are handled relatively inefficiently and with correspondingly higher latencies. This works well if all or most host accesses are sequential in nature and random accesses, if they occur, are allowed to be inefficient. However, if the workload changes to predominantly random host requests or if random accesses must also be conducted efficiently if they occur, then this scheme will not work well as it is only efficient for sequential accesses.

A second approach is to optimize the controller for a random workload, where random accesses are handled efficiently and with minimal latency and sequential accesses are handled relatively inefficiently and with corresponding higher latencies or lower bandwidth. This works well if all or most host accesses are random in nature and sequential accesses, if they occur, are allowed to be inefficient. However, if the workload changes to predominantly sequential host requests or if sequential accesses must also be conducted efficiently if they occur, then this scheme will not work well as it is only efficient for random accesses.

A third approach is to optimize a controller for neither sequential nor random workloads, but rather, for a compromise or average of sequential and random workloads. This has the advantage of favoring neither sequential nor random accesses, but averages inefficiency among both workloads. While this yields improved performance for mixed sequential and random workloads over the other two approaches, it does not handle either sequential or random workloads as efficiently as possible.

Accordingly, it would be advantageous to have a storage controller that automatically and dynamically optimizes operations to individual physical storage devices which form the RAID arrays according to actual sequential or random workloads.

SUMMARY

In one aspect, the present invention provides a method of determining whether processed I/O requests represent sequential or random data access patterns. Incoming I/O requests are processed by RAID software, which organizes the data for efficient reads and writes to storage devices. The range of Logical Block Addresses (LBAs) of an I/O request processed by RAID software is compared to a predetermined setting for stripe size in order to determine the locality by chunk of the processed I/O request to the chunk location of the immediately previous I/O request to the same storage device. Comparing the chunk locations of these two I/O requests will determine whether the data access pattern for a particular storage device is sequential or random. This data access pattern may be sampled in order to create a storage device access profile. The sampling may be on every I/O request, once every nth I/O request, once every time interval, or based on the more complex operation of a state machine. A storage device access profile for each storage device is stored in memory, and is used to determine I/O size and queue depth parameters.

In another aspect, the present invention provides a storage controller for optimizing sequential or random accesses to storage devices based on address characteristics of processed I/O requests. First and second I/O requests are analyzed for locality of reference by a CPU or microprocessor. The chunk locations of the first and second I/O request are stored in a volatile or non-volatile memory within the storage controller. The locality of reference is sampled by the microprocessor to determine a storage device access profile for each storage device, which is also stored in the memory. The sampling is performed by the microprocessor according to regular event or time-based criteria. The storage device access profile is then used by the microprocessor to establish queue depth and I/O size parameters for I/O operations to storage devices through a device interface. The optimal queue depth and I/O size parameters are dependent on whether sequential or random accesses are occurring, and the characteristics of the specific storage devices used. By dynamically adjusting the queue depth and I/O size parameters to storage devices, I/O requests are processed efficiently whether the received workload corresponds to sequential or random accesses.

Other features and advantages of the present invention will become apparent upon study of the remaining portions of the specification and drawings.

DETAILED DESCRIPTION

Figure 1A:
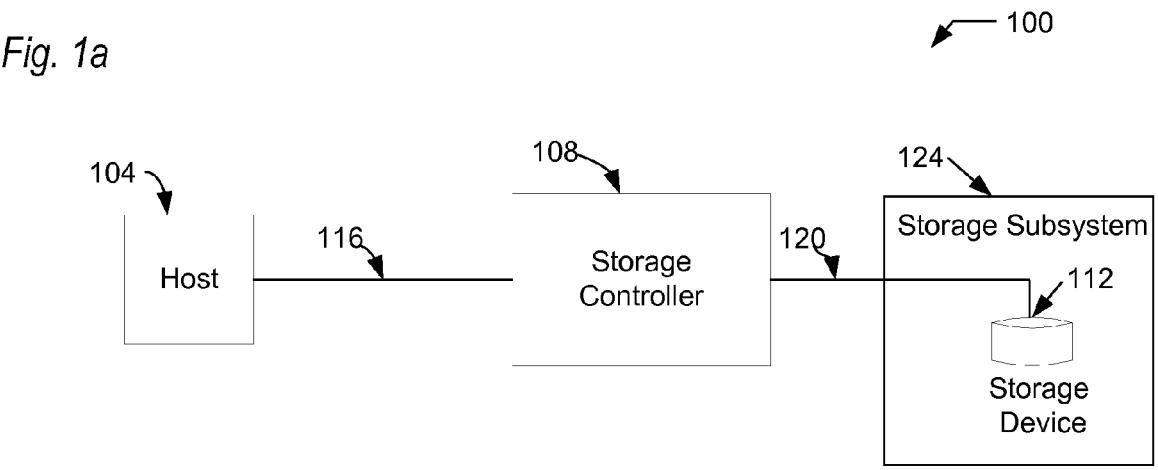
FIG. 1a is a block diagram illustrating a storage system configuration with a storage controller independent from a storage subsystem according to the present invention.

Storage controllers store data on storage devices in a fashion that is optimized for rapid reading and writing by the storage controller. Each data I/O operation to storage devices is composed of a variable number of data blocks, where data block size is usually fixed at 512 bytes. However, it is possible that block size could be different than 512 bytes; 4K bytes, for example. Storage controllers organize the storage devices into contiguous equal-sized regions across all storage devices that make up a logical volume. These equal-sized regions are called Stripes, and are usually 64Kbytes. However, a Stripe could be as small as 16Kbytes or as large as 128Kbytes or 256Kbytes. The portion of a Stripe on a single storage device is called a Chunk.

Chunks are computed within the storage controller by utilizing information within SCSI CDBs (Command Descriptor Blocks). Specifically, the LUN identifies the individual disk drive (Host bus adapters and non-RAID applications) or group of disk drives (RAID controllers) being addressed. The LBA and block count provide addressing information to determine the specific stripe(s) and chunk(s) that the I/O request is being directed to. Relatively small I/O requests may fit within a single chunk and stripe on a single storage device, whereas relatively large I/O requests may be spread across multiple chunks and stripes on several disk drives.

It is this geometry of stripes and chunks that determines whether data accesses to a given storage device are sequential or random for a pair of accesses. Temporally consecutive I/O operations that address the same chunk on the same storage device are defined as sequential. Also, temporally consecutive accesses to chunks that are adjacent on the same disk drive are defined as sequential. All other temporally consecutive accesses to the same storage device are defined as random. RAID logical volumes utilize groups of disk drives, commonly 2 to 16, that are striped across all drives in the volume. Because RAID logical volumes contain multiple disk drives, it is necessary to constantly determine and track the sequential/random state of accesses to each drive in a RAID logical volume.

Although a simple approach to determining random or sequential behavior of I/O requests would be to scan incoming LBAs through the host I/O interface, this method does not always provide good accuracy. That is because host computer file systems frequently re-order host I/O requests such that temporally consecutive requests may appear random at the host interface while at a macro level the requests are actually sequential (or vice versa). Therefore, the determination of random or sequential behavior must be made after the storage controller software has put the storage controller I/O requests into a logically efficient order to maximize performance and minimize disk drive seek operations.

Once the sequential or random nature of I/O accesses are known, it is advantageous to adjust certain parameters involving communication with disk drives in order to maximize performance in either sequential or random environments. Specifically, the queue depth and I/O size written to disk drives can have a large bearing on reading or writing efficiency, which translates into performance. For sequential accesses, it is desirable to use a lower queue depth and large I/O size when accessing drives. For random accesses, it is desirable to use higher queue depth and small I/O size when accessing drives. Queue depth is a function of disk drive design, and can vary from a minimum of 1 to 16 or 32. I/O size is also variable, and commonly ranges from 512 bytes (i.e. one block) to a megabyte or more.

Referring to FIG. 1a, a common embodiment of a storage system 100 is shown. One or more host computers 104 run applications that send read or write data requests across one or more host interconnections 116 to storage controller 108. The host computer 104 is typically a server, although it could also be a desktop or portable computer as well. Although the host interconnection 116 could be a single cable, it could just as well be multiple cables or a storage area network (SAN). Host interconnections 116 are commonly Fibre channel, SCSI, Ethernet, iSCSI, SAS (Serial Attached SCSI), SATA (Serial ATA), ATA, or Infiniband, but are not limited to these types of interfaces. Storage controller 108 receives the read or write data requests and converts them into storage device read or write data requests. These requests are sent across one or more storage device interconnections 120 to storage subsystem 124, where the storage device read or write request is sent to one or more storage devices 112. It could be either one physical storage device or a multiple device RAID volume. Storage device interconnections 120 are commonly Fibre channel, SCSI, SAS, SATA, or ATA, and may be the same as or different than host interconnections 116. There may also be a single storage device interconnection 120, or several cables.

Figure 1B:
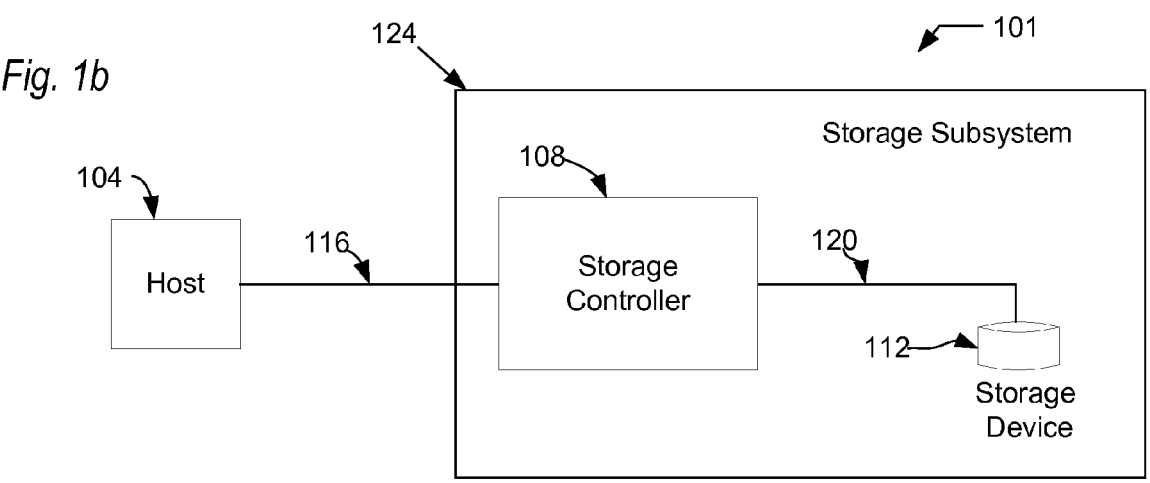
FIG. 1b is a block diagram illustrating a storage system configuration with a storage controller integrated into a storage subsystem according to the present invention.
Figure 1C:
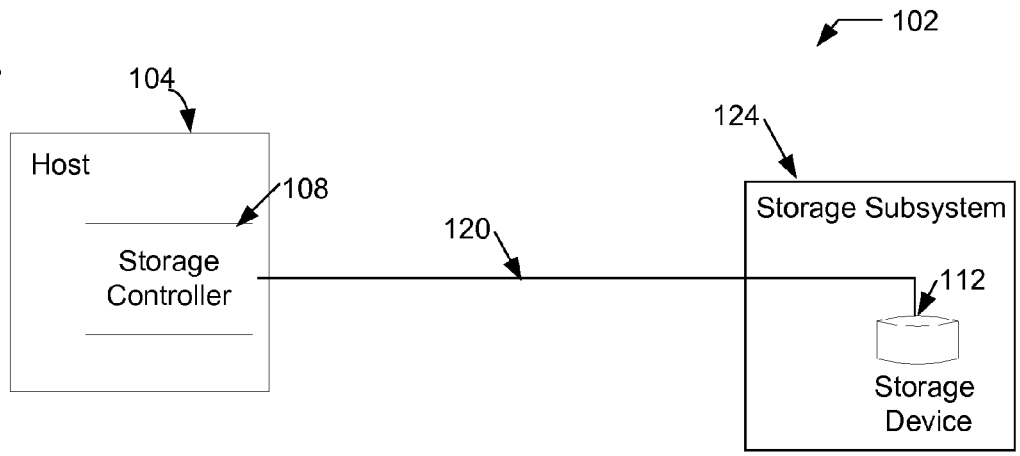
FIG. 1c is a block diagram illustrating a storage system configuration with a storage controller integrated into a host computer according to the present invention.

Alternatively, the storage controller 108 and storage device 112 may reside within the same storage subsystem 124, as shown in FIG. 1b. A further alternative is shown in FIG. 1c, whereby the storage controller 108 is physically contained within the host computer 104. In this case, host interconnections 116 are provided by internal buses within host computer 104, and may commonly be PCI, PCI-X, PCI Express, or Rapid I/O. However, it is conceivable that host interconnection 116 be any conceivable bus, and is not limited to just these variants. A storage subsystem 124 may either be in a separate chassis relative to the host computer 104, or the storage devices 112 may be physically located within the host computer 104. For simplicity, only a single host computer 104, host interconnection 116, storage controller 108, storage device interconnection 120, storage subsystem 124, and storage device 112 are shown. However, it should be understood that a plurality of any of these elements may be present in a representative system 100, 101, or 102.

Figure 2:
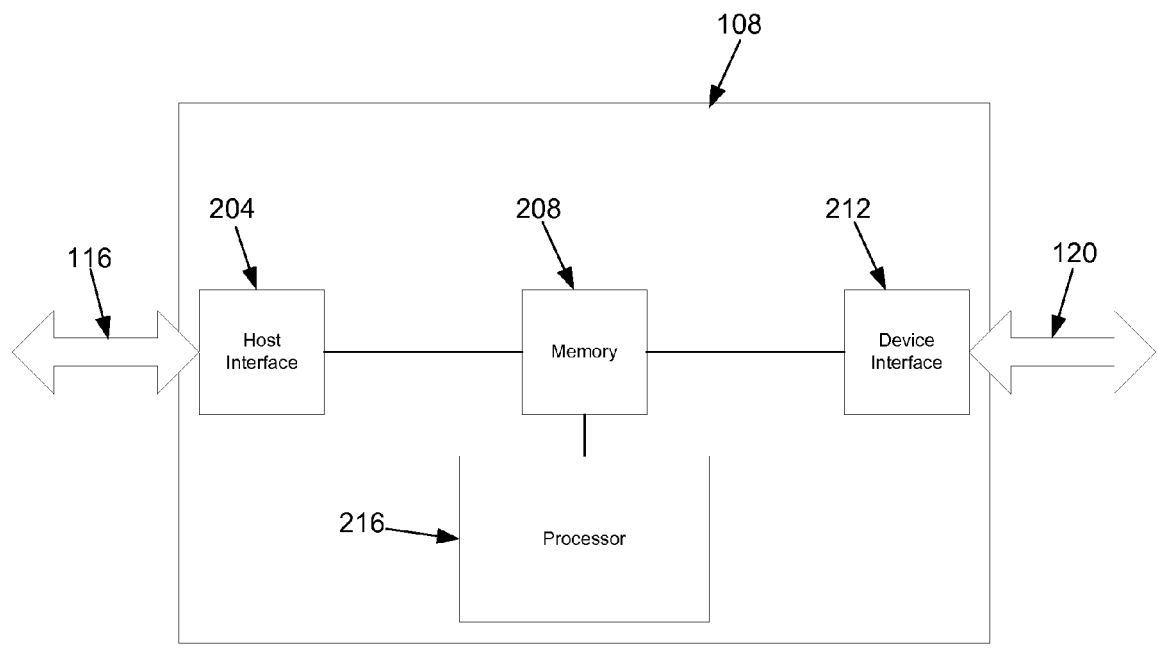
FIG. 2 is a block diagram of a representative storage controller according to the present invention.

Referring now to FIG. 2, a representative storage controller 108 is shown. Read or write data requests are received through one or more host interfaces 204, which is configured to store aspects of the I/O request in memory 208. This memory may be either volatile or non-volatile, and may be DRAM, SDRAM, Flash, NVRAM, or some other memory technology. Processor 216 analyzes the stored I/O requests, reorganizes them to maximize efficiency, and determines if a given sequence of I/O requests represents either sequential or random accesses. Based on this determination, processor 216 adjusts I/O characteristics accordingly, and transfers I/O requests to one or more storage device interconnections 120 through one or more device interfaces 212.

Figure 3:
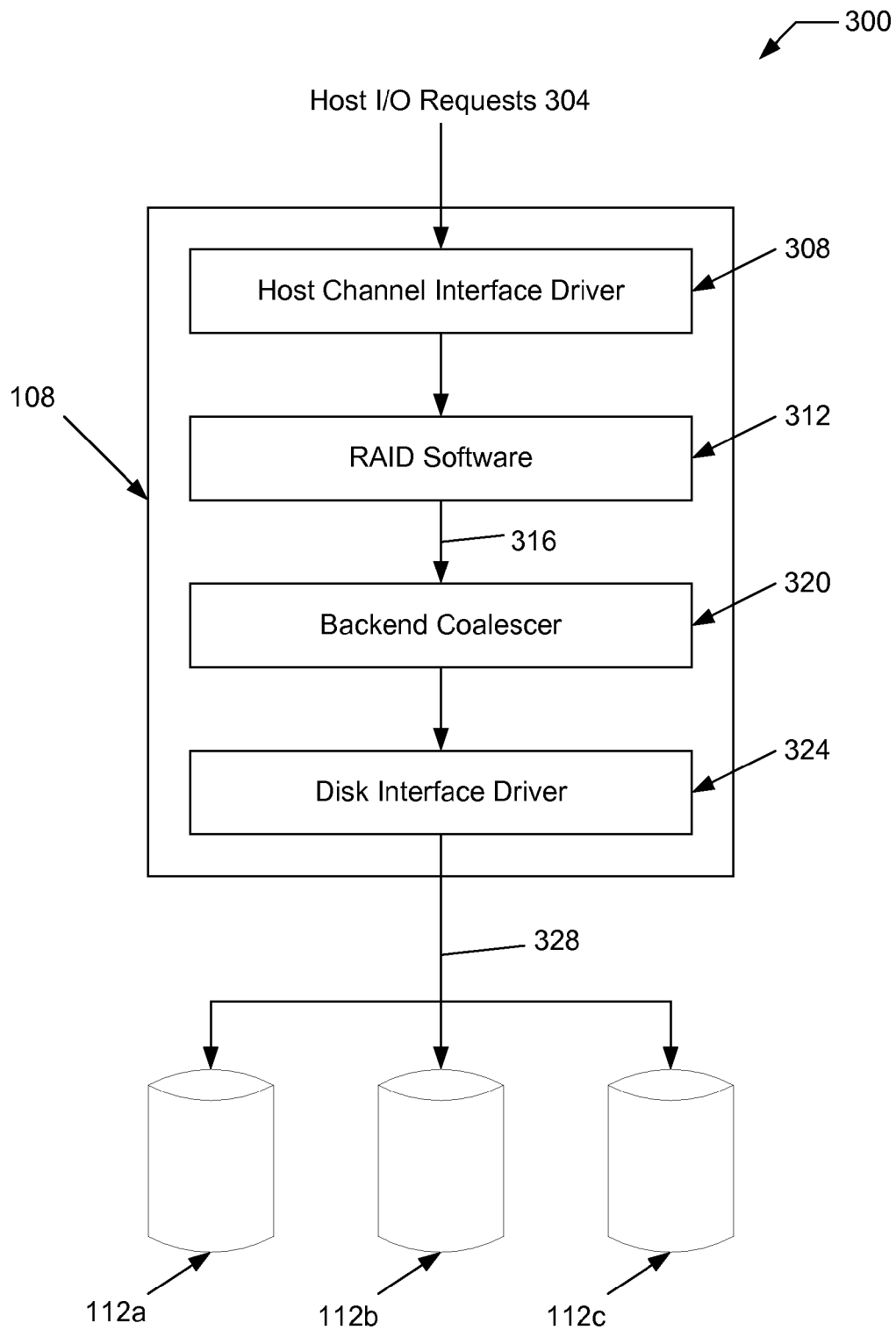
FIG. 3 is a depiction of the flow of I/O requests through a storage controller.

FIG. 3 depicts the required storage controller software layers 300 to practice the invention. Storage controller 108 receives Host I/O requests 304 through Host Channel Interface Driver 308, which translates SCSI commands into internal I/O commands suitable for use by RAID Software 312. RAID software 312 receives the internal I/O commands and mirrors, stripes, and calculates parity for the data based on the RAID level selected for the logical volume that each Host I/O request 304 is directed to. The RAID Software 312 then sends RAID I/O requests 316 to the Backend Coalescer 320, where they are combined and sequential or random storage device access profiles are calculated for each storage device 112 that is the recipient of a RAID I/O request 316. The Backend Coalescer 320 then transmits physical I/O requests to Disk Interface Driver 324, which converts physical I/O requests to storage device I/O requests 328 for the storage devices 112a, 112b, 112c. Although the RAID function is shown as implemented in software, it may also be implemented in hardware or in an Application Specific Integrated Circuit (ASIC).

Figure 4:
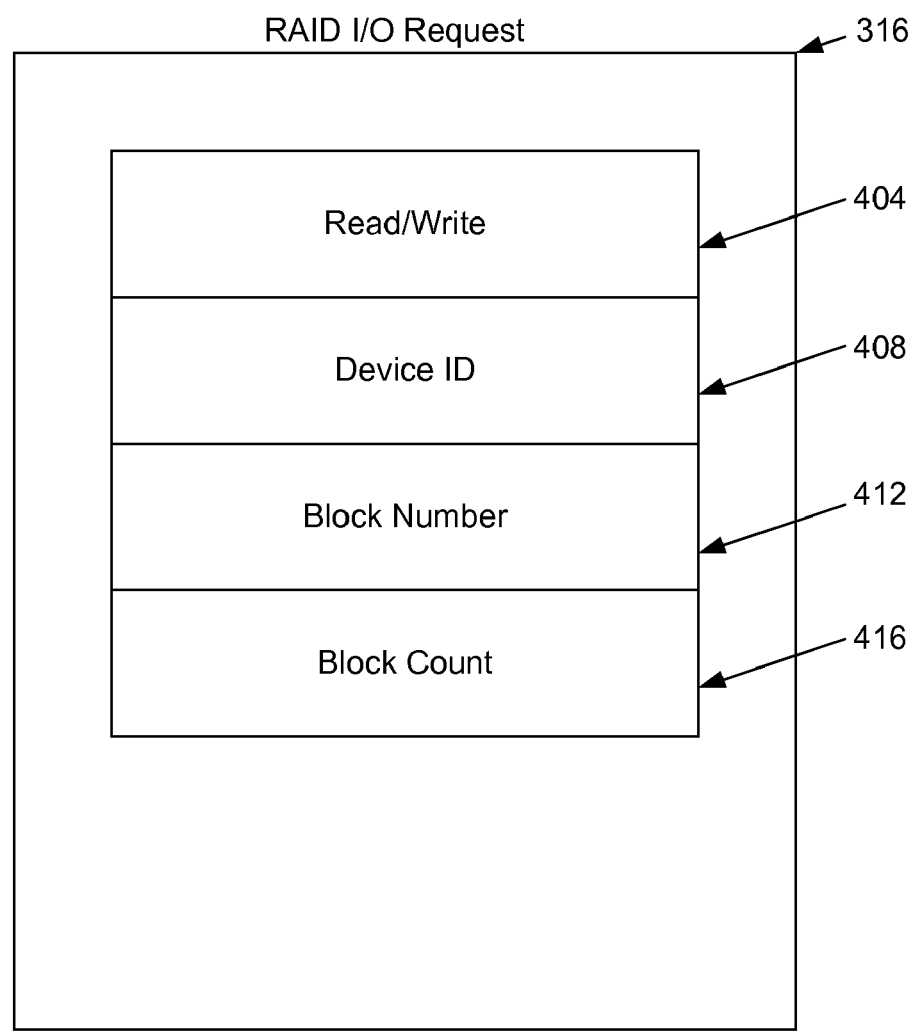
FIG. 4 is a depiction of the elements of a RAID I/O request.

FIG. 4 shows the minimum elements that make up a RAID I/O request 316. There must first be a field 404 designating whether the specific RAID I/O request is a read or a write operation. Next there must be a Device ID field 408, where the physical storage device that the RAID I/O request is directed to is identified. The Block Number field 412 is the starting LBA for the RAID I/O request 316, and the Block Count field 416 is used to designate the number of bytes in the RAID I.O request 316. Since each RAID I/O request 316 is directed to a specific storage device 112, the number of bytes in the RAID I/O request 316 can never exceed the chunk size—it can only be the chunk size or smaller.

Figure 5:
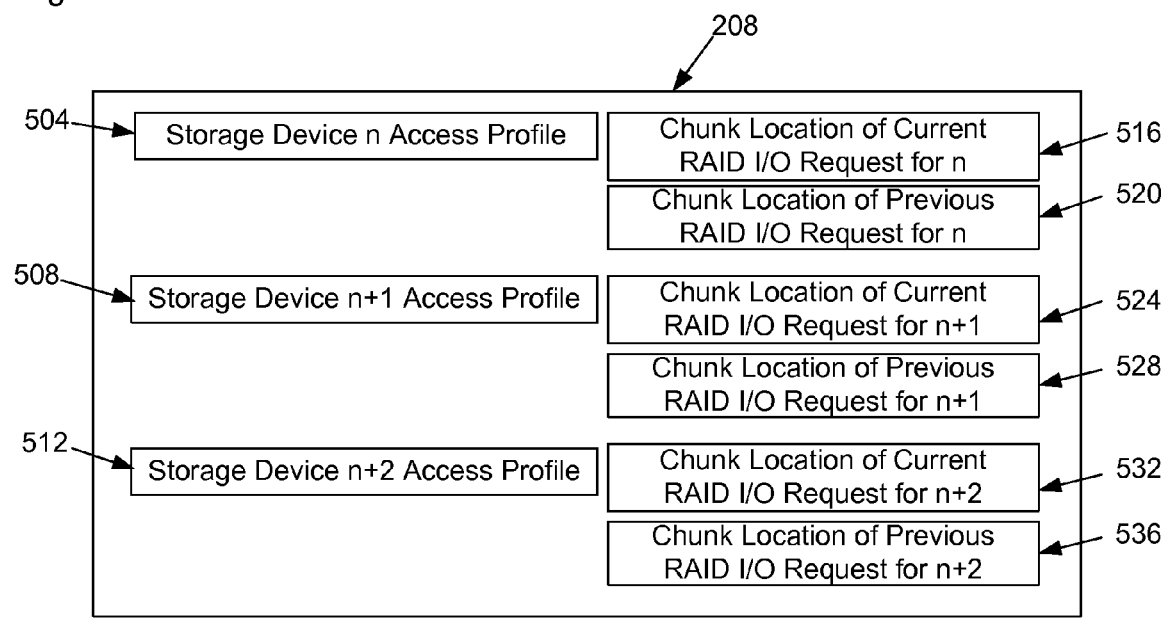
FIG. 5 is a diagram of the various parameters stored in storage controller memory for each I/O request issued internally to the RAID software component.

FIG. 5 depicts variables for three representative storage devices n, n+1, and n+2 stored in memory 208. The current storage device access profile 504, 508, and 512 is either sequential or random, and is stored in memory initially on power up as sequential. However, it would be just as valid to make the power-up default for storage device access profiles be random. In addition to the storage device access profile for each storage device, memory 208 would also store the location for the last pair of I/O requests issued to each storage device n, n+1, n+2. These locations are represented by 516 and 520 for storage device n, 524 and 528 for storage device n+1, and 532 and 536 for storage device n+2. These locations are sampled according to various criteria in order to update the storage device access profile for each storage device.

In a simplest form, the locations may be sampled each time a new RAID I/O request is generated. Based on locality of the previous location to the current location, the sequential or random state for storage device access profile 504, 508, 512 would be updated. This would result in possibly rapid changes to the storage device access profiles, if the sampled locations of I/O requests were alternating between sequential and random. One improvement to this might be to sample every m I/O requests, where m was greater than 1 but small enough so that the storage controller would still respond rapidly to changing conditions. This approach has the benefit of filtering rapidly changing inputs such that the controller would tend to follow the inputs with a slower rate of change and possibly improved efficiency of storage device access. An alternative approach would be to sample at some regular time interval. This would also have the effect of filtering rapidly changing inputs such that the controller would tend to follow the inputs with a slower rate of change.

Figure 7:
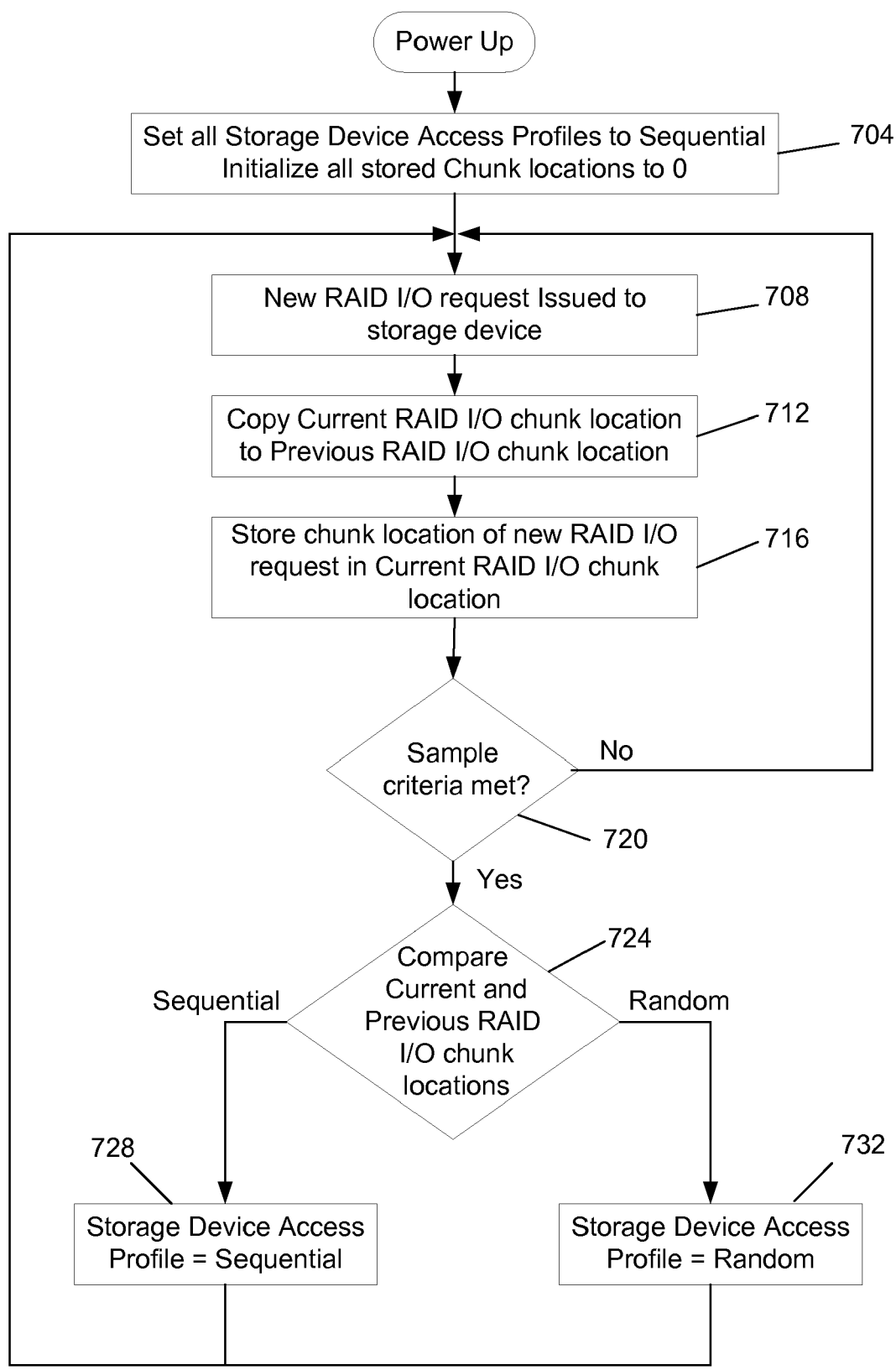
FIG. 7 is a flowchart depicting the method of the present invention to monitor RAID I/O requests and determine the storage device access profile.
Figure 8:
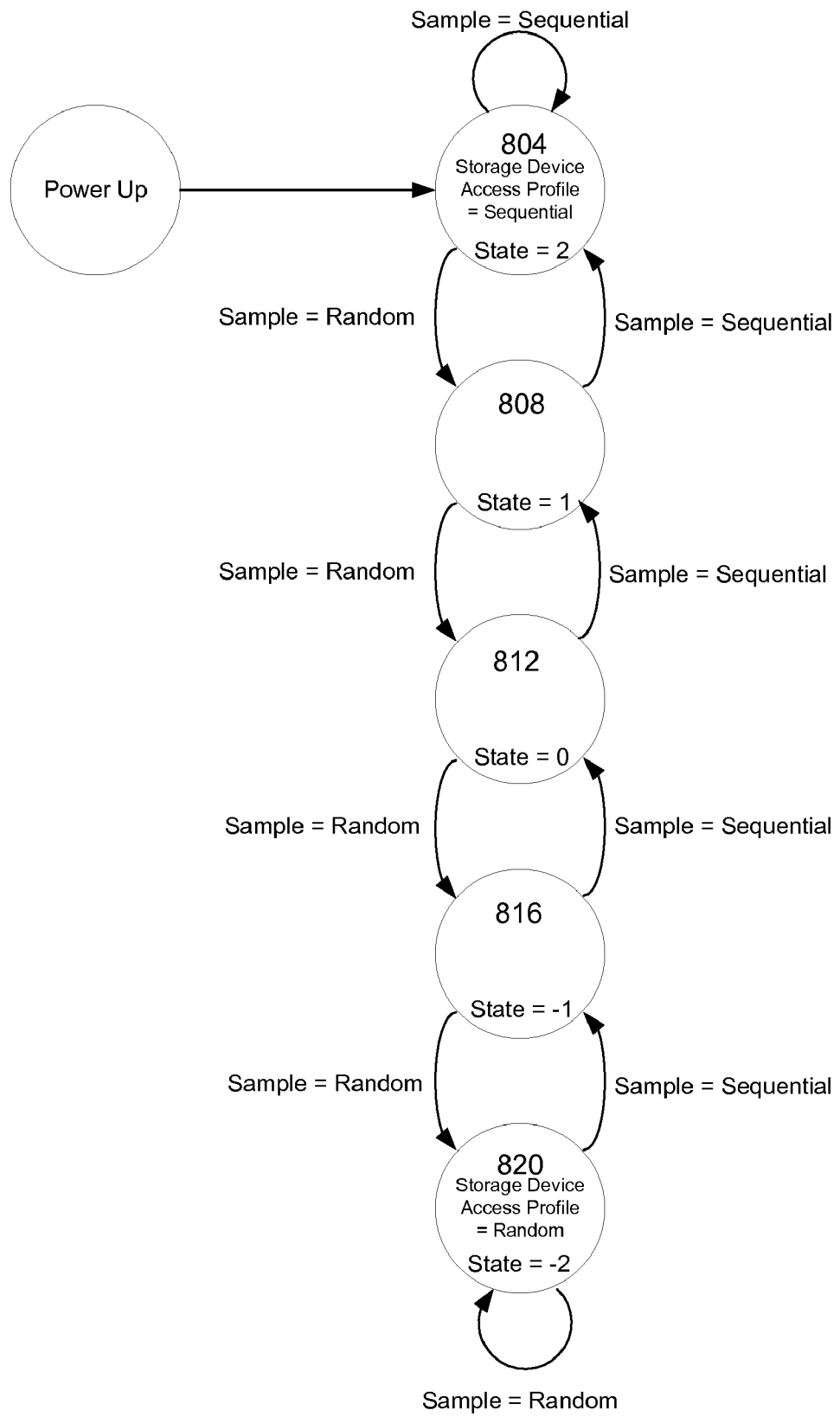
FIG. 8 is a state diagram depicting the preferred method of the present invention to determine the storage device access profile.
Figure 9:
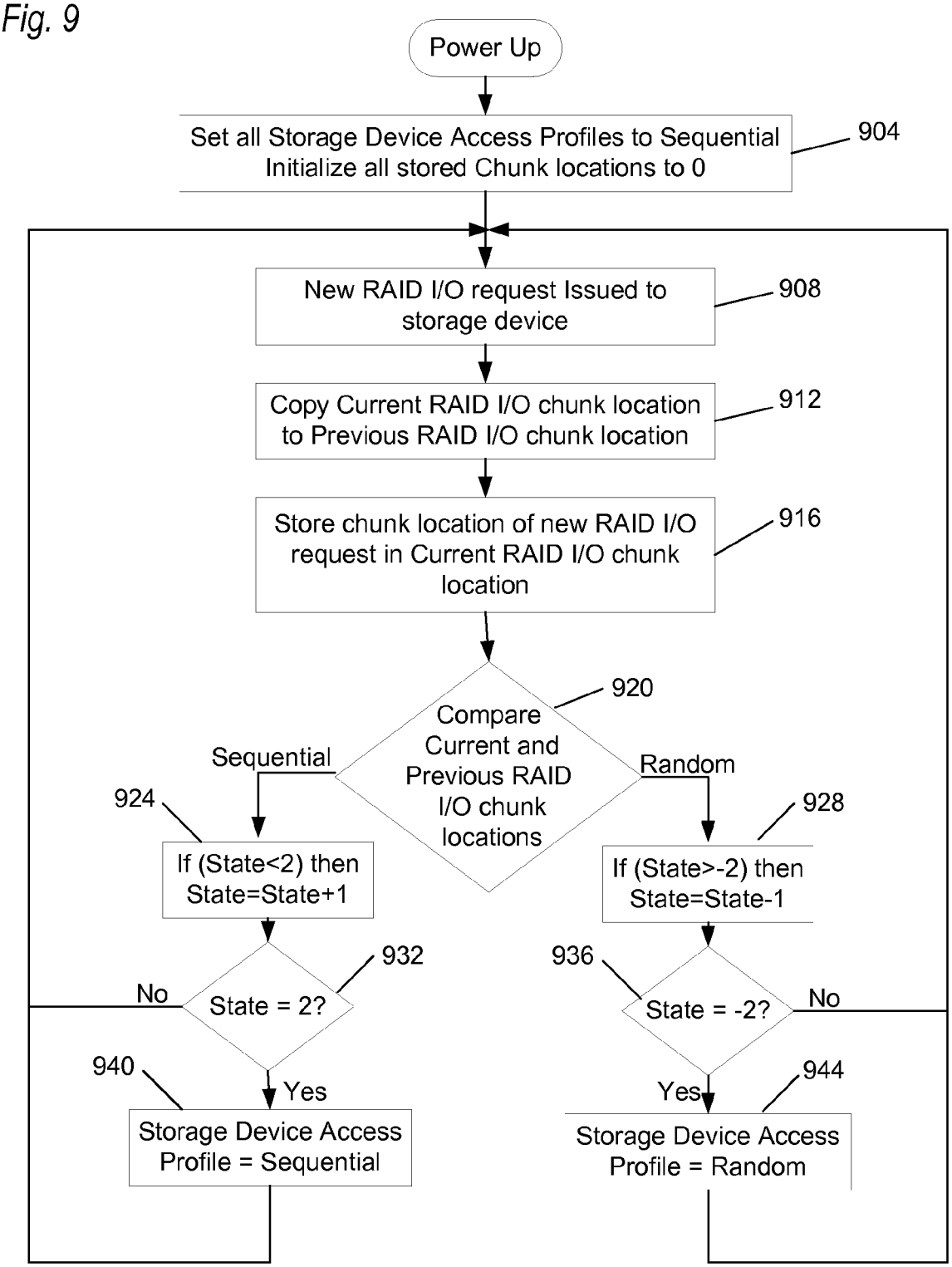
FIG. 9 is a flowchart depicting the preferred method of the present invention to utilize the state machine of FIG. 8 to monitor RAID I/O requests and determine the storage device access profile.

Considering the three variables pertaining to a single storage device n, although the storage device access profile 504 may be sequential or random at the same time as the chunk locations 516, 520 associated with that same storage device, it may not be. That is because sampling is applied to the chunk locations such that the sampling behavior will determine when the storage device access profile 504 is updated. For simple cases of sampling, the method applied is shown in FIG. 7. For the more complex sampling used in the preferred embodiment, the method used is shown in FIGS. 8 and 9.

Figure 6A:
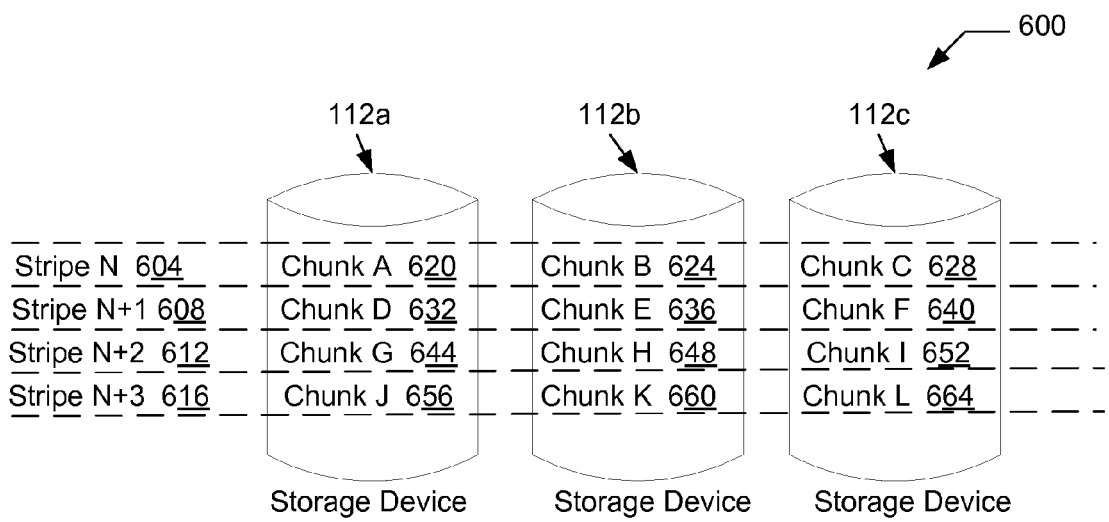
FIG. 6a is a depiction of how data is stored on storage devices according to a stripe and chunk organization.

Turning to FIG. 6a, a partitioned group of storage devices 600 are shown. The partitioning is reflected on multiple storage devices 112a, 112b, and 112c, which are random access storage peripherals such as hard disk drives or optical drives.

Data is written to the storage devices 112 in stripes. Four such stripes N 604, N+1 608, N+2 612, and N+3 616 are shown, although many hundreds or thousands of stripes may be on a single storage device. Recall that a single chunk would be the portion of a stripe on a single drive. Therefore, for a three storage device RAID array as shown, there would be three chunks per stripe, or 12 chunks 'A' through 'L' per four stripes. Stripe N 604 includes Chunk A 620 on Storage Device 112a, Chunk B 624 on Storage Device 112b, and Chunk C 628 on Storage Device 112c. Stripe N+1 608 includes Chunk D 632 on Storage Device 112a, Chunk E 636 on Storage Device 112b, and Chunk F 640 on Storage Device 112c. Stripe N+2 612 includes Chunk G 644 on Storage Device 112a, Chunk H 648 on Storage Device 112b, and Chunk I 652 on Storage Device 112c. Stripe N+3 616 includes Chunk J 656 on Storage Device 112a, Chunk K 660 on Storage Device 112b, and Chunk L 664 on Storage Device 112c. In order to determine the random or sequential nature of temporally adjacent accesses, it is necessary for processor 216 to determine the locality of accesses for each storage device. Processor 216 does this by determining the stripe and chunk location for each temporally consecutive pair of RAID I/O requests to the same storage device.

Figure 6B:
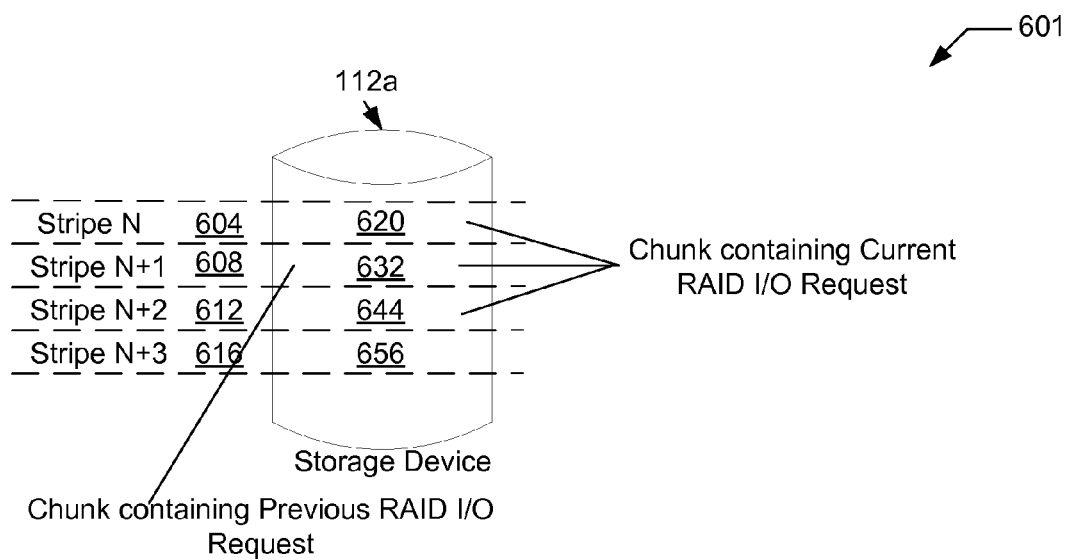
FIG. 6b is a depiction of the conditions to determine sequential access patterns for a single storage device.

Sequential or random accesses are determined separately for each storage device. Referring now to FIG. 6b, a block diagram illustrating one storage device 601 of the storage devices 600 of FIG. 6a for illustrating the method used to determine sequential or random accesses for a single storage device 112a is shown. Assume a previous RAID I/O request is made to chunk 632. If a current RAID I/O request temporally consecutive to the first RAID I/O request were made to either of chunks 620, 632, or 644, they would be considered sequential since they would be made to either the same chunk as the previous RAID I/O request, or to an adjacent chunk to the chunk included in the previous RAID I/O request. If the current RAID I/O request were instead made to chunk 656, it would therefore be considered random compared to the previous RAID I/O request because it would not be in the same or adjacent chunk(s) as the previous RAID I/O request.

Figure 6C:
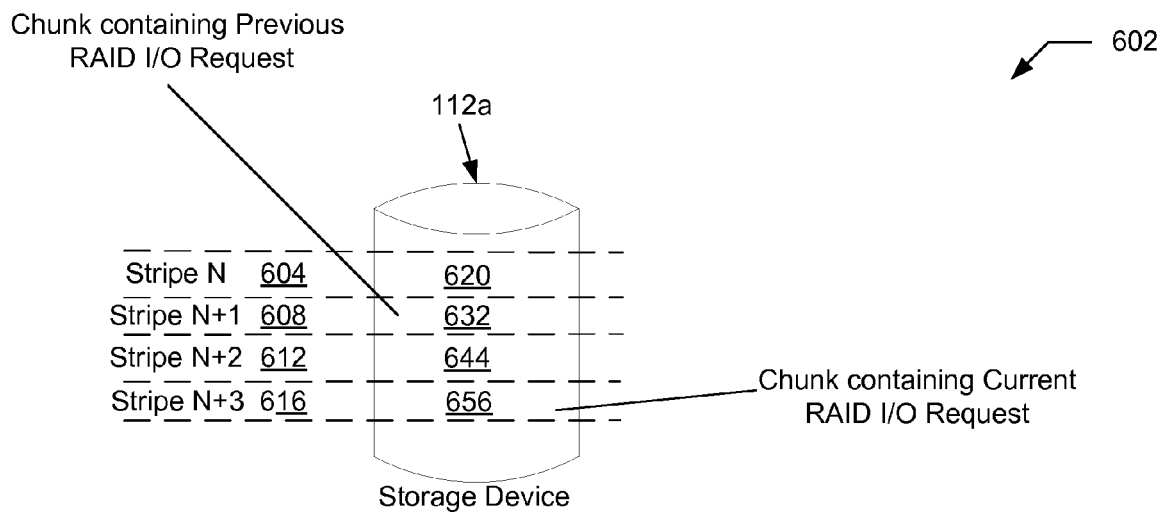
FIG. 6c is a depiction of a condition to determine a random access pattern for a single storage device.

Referring now to FIG. 6c, a block diagram illustrating one storage device 602 of the storage devices 600 of FIG. 6a for illustrating a situation where a previous RAID I/O request is made to chunk 632 of storage device 112a, with a temporally consecutive current RAID I/O request made to chunk 656. In this case, the current RAID I/O request would be considered random since it is not made to the chunk included in the previous RAID I/O request, nor to an adjacent chunk to the chunk included in the previous RAID I/O request.

Figure 6D:
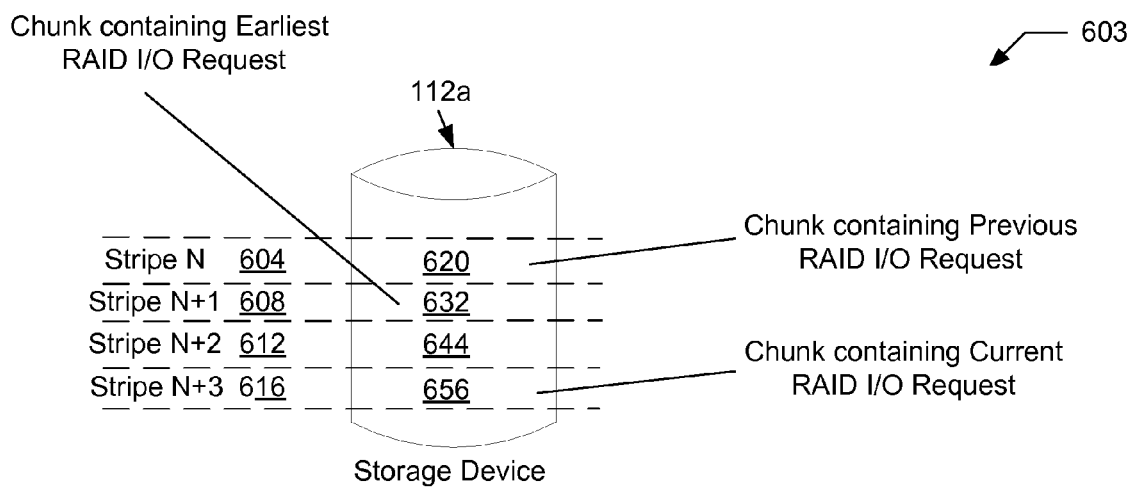
FIG. 6d is a depiction of conditions to determine sequential and random access patterns for a single storage device.

Referring now to FIG. 6d, a block diagram illustrating one storage device 603 of the storage devices 600 of FIG. 6a for illustrating a situation involving three temporally consecutive RAID I/O requests to storage device 112a, whereby the earliest RAID I/O request is made to chunk 632. The previous RAID I/O request made to chunk 620 is a sequential request since it is made to a chunk adjacent to the chunk included in the earliest RAID I/O request. However, the current RAID I/O request made to chunk 656 is a random request since it is not made to the same chunk used for the temporally consecutive (previous) RAID I/O request, nor to a chunk adjacent to that used for the previous RAID I/O request. It does not matter that the current RAID I/O request is to a chunk adjacent to that used for the earliest RAID I/O request, since the earliest and current RAID I/O requests are not temporally consecutive.

The invention includes a process for determining the current storage device access profile for each storage device 112, and this is shown in FIG. 7. Such a process would be observed for each storage device 112 controlled by storage controller 108. The process starts upon power up at step 704, where a value of "sequential" is stored for all storage device access profiles and all chunk locations corresponding to those storage device access profiles are initialized to a zero value. The default storage device access profile could just as easily be a value of "random", depending on emphasis based on common expected usage, and simply sets an initial value for the variable. A RAID I/O request 316 from RAID software 312 is issued to the storage device 112 in step 708. The chunk location for the current RAID I/O request is copied to the chunk location of the previous RAID I/O request for that storage device 112 in step 712. Then in step 716 the chunk location of the new RAID I/O request is stored to the current RAID I/O request chunk location. This then establishes two chunk locations that can be compared spatially in order to determine whether the new RAID I/O request is sequential or random compared with the temporally previous RAID I/O request to that storage device 112. At this point, a determination is made in step 720 if the sampling criteria has been met.

In the simplest case where the chunk locations to the last two temporally consecutive RAID I/O requests are sampled whenever a new RAID I/O request is issued to a storage device, this determination would always be affirmed and control would proceed to step 724. However, there are two other cases in which the sample criteria might not initially be met, with the result that control would return to step 708 to await a new RAID I/O request. The first such case would be if the sampling criteria involved sampling every m RAID I/O requests to a given storage device. Each time step 720 was encountered, m would be decremented. Upon reaching zero, the count would be restored to m and flow would proceed to step 724. The second such case would be if the sampling criteria involved sampling at a regular time interval. This would require a separate timer to be operated. Similar to the method described in the first such case, each time step 720 were encountered, there would be a check to verify if the timer had reached zero. Upon reaching zero, the timer would be restored to begin a new count and flow would proceed to step 724.

At step 724, a determination is made as to whether the sampled chunk locations represent either a sequential or random condition. If sequential, then flow will proceed to step 728, where the storage device access profile is updated to sequential, and flow returns to step 708 to wait for a new I/O request. If random, then flow will proceed to step 732, where the storage device access profile is updated to random, and flow returns to step 708.

In the preferred embodiment, a predetermined number of samples having the opposite state as the current storage device access profile would be required before the storage device access profile changed to the opposite state. This is reflected in FIG. 8, which depicts a state machine used for a single storage device. Therefore, each storage device would have a separate such state machine in operation from all other storage devices. The state machine powers up into state 2 804, where the storage device access profile is set to sequential. It stays in this state as long as samples of the chunk locations of RAID I/O requests to that storage device continue to be sequential. The first time a sample is random, however, the state transitions to state 1 808. From this state, it will return to state 2 804 if the next sample is sequential, or instead transition to state 0 812 if the next sample is random. After reaching state 0 812, the state machine will transition back to state 1 808 if the next sample is sequential, or proceed to state −1 816 if the next sample is random. From state −1 816, the state machine will transition back to transition state 0 812 if the sample is sequential, or proceed to state −2 820 if the sample is random. Once in state −2 820, the state machine will stay in that state if the sample reflects a random RAID I/O request, or proceed back to state −1 816 if the sample reflects a sequential RAID I/O request. Note that the only time the storage device access profile is updated is in state 2 804 and state −2 820.

It should be noted that it would be just as valid for the state machine to power up into random state −2 820 as sequential state 2 804. In addition, the sample frequency may be based on either individual RAID I/O requests or time. That is, while the preferred embodiment would be based on sampling every RAID I/O request to the given storage device, the state machine could be mechanized to sample every nth RAID I/O request, or at some regular time interval. While the alternative sampling approaches would respond more slowly than the preferred embodiment, they would have the benefit of less processor 216 utilization and slower transitions in the event of statistically noisy inputs characterized by numerous and rapid transitions between random and sequential RAID I/O requests. The state machine of FIG. 8 could also be mechanized with fewer or more states than the five states shown, to respond faster or slower to changes in RAID I/O access patterns.

In conjunction with FIG. 8, the preferred embodiment also includes a flowchart depicted in FIG. 9. This flowchart is identical to that shown in FIG. 7 up to step 716 (916), so the description for FIG. 7 applies up to step 916. Following step 916, where the chunk location of the new RAID I/O request is stored in memory 208 location corresponding to the current RAID I/O chunk location, flow transitions to step 920 where the first and second RAID I/O chunk locations are compared. If they are sequential, then flow proceeds to step 924. If they are random, then flow proceeds to step 928. In step 924, if the state in FIG. 8 is less than 2, then the state is incremented. This has the effect of transitioning the state machine toward state 804. From step 924, flow proceeds to step 932 where the current state is compared to 2 (state 804 of FIG. 8). If the state is equal to 2, then flow proceeds to step 940 where the storage device access profile is set to sequential and flow returns to step 908 to await the next RAID I/O request. If the state is not equal to 2, then the conditions for a change to the storage device access profile have not been met and flow returns to step 908. In step 928, if the state in FIG. 8 is greater than −2, then the state is decremented. This has the effect of transitioning the state machine toward state 820. From step 928, flow proceeds to step 936 where the current state is compared to −2 (state 820 of FIG. 8). If the state is equal to −2, then flow proceeds to step 944 where the storage device access profile is set to random and flow returns to step 908 to await the next RAID I/O request. If the state is not equal to −2, then the conditions for a change to the storage device access profile have not been met and flow returns to step 908.

While the discussion to this point has focused on what would constitute sequential or random RAID I/O requests, and when transition to a different storage device access profile occurs, there now must be definition of the characteristics of the storage device access profile. As stated earlier, sequential access profiles have correspondingly low queue depth and large I/O sizes relative to random access profiles. Although all disk drives have a minimum queue depth of 1, it is advantageous to use a queue depth of 2 for all sequential profiles (except SATA I drives), since there is command processing latency benefit to having the next I/O ready to be executed by the drive at all times. Since SATA I drives only support a queue depth of 1, that would have to be used for all profiles. The sequential access profile I/O size is heavily drive-dependent, and depends on the design of the individual disk drive and memory available on the drive. Empirical testing may be needed to determine the optimal I/O size to use, although efficient values in the area of 1 MByte for Fibre Channel and SATA II drives, 64 Kbytes for SATA I drives, and 512 Kbytes for SAS drives may be used.

In comparison to sequential storage device access profiles, random storage device access profiles would generally be characterized by higher queue depths. However, even though some drives support higher queue depths of 32 or even 64 commands, those figures may not yield the best performance. Again, empirical testing would be necessary to confirm optimal values for any particular disk drive. An efficient queue depth of 8-12 commands may be used for some disk drives. Storage device command I/O sizes are most efficiently dealt with when they match the size of the RAID I/O request. For example, for a 4 Kbyte RAID I/O request, the I/O size to storage devices should be 4 Kbytes.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein above are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A method for a storage controller to access a physical storage device based on a history of commands issued to the physical storage device, the method comprising:

storing address information in memory for a plurality of most recent temporally consecutive commands to the physical storage device;

sampling the address information according to a predetermined event;

dynamically updating an access profile for the physical storage device between sequential and random states, based on the sampled address information;

issuing a plurality of commands to the physical storage device with a varying command queue depth, depending upon the storage device access profile, wherein the command queue depth is the number of concurrent commands the storage controller is allowed to issue to the physical storage device; and causing each of the plurality of physical storage devices to be accessed using a first command queue depth if its access profile indicates sequential and using a second command queue depth if its access profile indicates random, wherein the first command queue depth is less than the second command queue depth.

2. The method as recited in claim 1, wherein an array of a plurality of physical storage devices controlled by the storage controller comprises the physical storage device, the method further comprising:

receiving host I/O requests through a host interface of the storage controller; and decomposing each host I/O request into one or more of the commands to the physical storage device, prior to said storing address information.

3. The method as recited in claim 1, wherein the address information specifies a chunk of the physical storage device to which the command is directed.

4. The method as recited in claim 1, wherein the sampling comprises reading the address information from memory for the temporally consecutive commands to the physical storage device, after a predetermined event has occurred.

5. The method as recited in claim 4, wherein the predetermined event is a command issued to the physical storage device.

6. The method as recited in claim 4, wherein the predetermined event is a predetermined number of commands having been issued to the physical storage device.

7. The method as recited in claim 4, wherein the predetermined event is a predetermined time interval having elapsed since the most recent sampling.

8. The method as recited in claim 1, wherein there exists a storage device access profile for each of a plurality of physical storage devices.

9. The method as recited in claim 1, wherein said dynamically updating a storage device access profile comprises:
updating the storage device access profile to the sequential state if a plurality of the temporally consecutive commands are spatially adjacent to one another; and
otherwise, updating the storage device access profile to the random state.

10. The method as recited in claim 9, wherein the temporally consecutive commands are spatially adjacent based on a previous chunk corresponding to a previous command and a current chunk corresponding to a current command.

11. The method as recited in claim 10, wherein the storage device access profile is sequential when the current chunk is located on the same storage device and is located within the same or an adjacent stripe to any stripe containing the previous chunk.

12. The method as recited in claim 10, wherein the storage device access profile is random when the current chunk is located on the same storage device and is not located within the same or an adjacent stripe to any stripe containing the previous chunk.

13. The method as recited in claim 1, wherein said issuing a plurality of commands to the physical storage device with a varying command queue depth, depending upon the storage device access profile further comprises:
issuing a plurality of commands to the physical storage device with a varying command queue depth and block size, depending upon the storage device access profile.

14. The method as recited in claim 13, wherein the varying block size is greater for the sequential storage device access profile state than for the random storage device access profile state.

15. A storage controller for optimizing accesses to a plurality of physical storage devices, the storage controller comprising:
a memory, configured to store:
information from I/O requests, wherein each of the I/O requests specifies one of the plurality of physical storage devices to be accessed, wherein the information specifies a location to be accessed on the specified physical storage device; and
an access profile for each of the plurality of physical storage devices, wherein each of the access profiles indicates whether the recent I/O requests to the physical storage device are sequential or random; and a microprocessor, coupled to said memory, operable to:
populate the access profile for each of the plurality of physical storage devices based on the information related to the I/O requests information stored in the memory; and
cause each of the plurality of physical storage devices to be accessed using a first command queue depth if its access profile indicates sequential and using a second command queue depth if its access profile indicates random, wherein the first command queue depth is less than the second command queue depth.

16. The storage controller as recited in claim 15, wherein the access profile for each of the plurality of physical storage devices following power-up indicates sequential access.

17. The storage controller as recited in claim 15, wherein the access profile for each of the plurality of physical storage devices following power-up indicates random access.

18. The storage controller as recited in claim 15, wherein the physical storage device comprises a hard disk drive, optical drive, solid state disk drive, or any randomly accessible storage device.

19. The storage controller as recited in claim 15, wherein the memory is a volatile memory.

20. The storage controller as recited in claim 15, further comprising:
program instructions, stored in the memory, for execution by the microprocessor, for instructing the microprocessor to populate the access profile for each of the plurality of physical storage devices based on the information related to the I/O requests information stored in the memory and to cause each of the plurality of physical storage devices to be accessed using a first command queue depth if its access profile indicates sequential and using a second command queue depth if its access profile indicates random.

21. A method for a storage controller to access a physical storage device based on a history of commands issued to the physical storage device, the method comprising:
storing address information in memory for a plurality of temporally consecutive commands to the physical storage device;
sampling the address information after new address information has been stored;
dynamically updating an access profile for the physical storage device between sequential and random states, based on predetermined conditions;
issuing a plurality of commands to the physical storage device with a varying command queue depth, depending upon the access profile, wherein the command queue depth is the number of concurrent commands the storage controller is allowed to issue to the physical storage device; and
causing each of the plurality of physical storage devices to be accessed using a first command queue depth if its access profile indicates sequential and using a second command queue depth if its access profile indicates random, wherein the first command queue depth is less than the second command queue depth.

22. The method as recited in claim 21, wherein an array of a plurality of physical storage devices controlled by the storage controller comprises the physical storage device, the method further comprising:
receiving host I/O requests through a host interface of the storage controller; and
decomposing each host I/O request into one or more of the commands to the physical storage device, prior to said storing address information.

23. The method as recited in claim 21, wherein the address information comprises chunks in the physical storage device that a command is directed to.

24. The method as recited in claim 21, wherein the most recent temporally consecutive commands are directed to the physical storage device.

25. The method as recited in claim 21, wherein the sampling comprises reading the address information from memory for the two most recent commands to the physical storage device.

26. The method as recited in claim 25, wherein the two most recent commands are spatially adjacent based on a chunk corresponding to a previous command and a second chunk corresponding to a current command.

27. The method as recited in claim 26, wherein the sample is sequential when the current chunk is located on the same storage device and is located within the same or an adjacent stripe to any stripe containing the previous chunk.

28. The method as recited in claim 26, wherein the sample is random when the current chunk is located on the same storage device and are not located within the same or an adjacent stripe to any stripe containing the previous chunk.

29. The method as recited in claim 21, wherein there exists an access profile for each of a plurality of physical storage devices.

30. The method as recited in claim 21, wherein said dynamically updating an access profile, comprises:

initializing a count associated with the physical storage device;
   updating the count, in response to said sampling;
   said dynamically updating the access profile, based on said updating the count.

31. The method as recited in claim 30, wherein said dynamically updating the access profile, based on said updating the count, comprises:

updating the access profile from the sequential state to the random state if the count reaches a first predetermined value; and
   updating the access profile from the random state to the sequential state if the count reaches a second predetermined value.

32. The method as recited in claim 31, wherein the first predetermined value and second predetermined value are 4.

33. The method as recited in claim 21, wherein said issuing a plurality of commands to the physical storage device with a varying command queue depth, depending upon the storage device access profile further comprises:

issuing a plurality of commands to the physical storage device with a varying command queue depth and block size, depending upon the storage device access profile.

34. The method as recited in claim 33, wherein the varying block size is greater for the sequential access profile state than for the random access profile state.

* * * * *